(12) United States Patent
Losolla

(10) Patent No.: US 11,226,268 B2
(45) Date of Patent: Jan. 18, 2022

(54) SOIL EXTRACTION AND MEASUREMENT TOOL

(71) Applicant: Victor A. Losolla, Roswell, NM (US)

(72) Inventor: Victor A. Losolla, Roswell, NM (US)

( * ) Notice: Subject to any disclaimer, the term of this patent is extended or adjusted under 35 U.S.C. 154(b) by 149 days.

(21) Appl. No.: 16/284,640

(22) Filed: Feb. 25, 2019

(65) Prior Publication Data

US 2020/0271551 A1   Aug. 27, 2020

(51) Int. Cl.
   *G01N 1/08*   (2006.01)
   *E02D 1/02*   (2006.01)
   *G01B 5/18*   (2006.01)

(52) U.S. Cl.
   CPC .............. *G01N 1/08* (2013.01); *E02D 1/025* (2013.01); *G01B 5/18* (2013.01)

(58) Field of Classification Search
   CPC .. G01N 1/08; E02D 1/025; G01B 5/18; A01B 1/165; E21B 25/00; E21B 11/02
   See application file for complete search history.

(56) References Cited

U.S. PATENT DOCUMENTS

| | | | |
|---|---|---|---|
| 3,273,930 A * | 9/1966 | Gottfried | A01C 5/02 111/101 |
| 4,098,360 A | 7/1978 | Clements | |
| 4,117,896 A * | 10/1978 | Weber | E21B 12/06 175/308 |
| 4,790,392 A | 12/1988 | Clements | |
| 4,884,638 A | 12/1989 | Hoffman | |
| 5,209,129 A | 5/1993 | Jaselskis et al. | |
| 5,615,744 A * | 4/1997 | Krafka | A01B 1/165 172/21 |
| 5,663,649 A * | 9/1997 | Topp | E02D 1/027 324/643 |
| 1,780 A | 2/1999 | Melega | |
| 6,647,799 B1 | 11/2003 | Raper et al. | |
| 7,104,343 B2 * | 9/2006 | Roberts | E02D 1/02 175/40 |
| 8,230,950 B2 | 7/2012 | Alcov | |

FOREIGN PATENT DOCUMENTS

| | | |
|---|---|---|
| DE | 3728669 A1 | 3/1989 |
| DE | 4411829 A1 | 10/1995 |
| WO | 2004/105459 A1 | 12/2004 |

* cited by examiner

*Primary Examiner* — Justin N Olamit
(74) *Attorney, Agent, or Firm* — Loza & Loza, LLP; Gordon R. Lindeen, III

(57) ABSTRACT

A soil extraction and measurement tool is described. In one example, the tool has a guide having a sleeve and a plate. The sleeve is attached to the plate, extending substantially horizontally from the plate, and having an opening to receive a probe. A probe has a point at an end configured to be inserted into the sleeve of the guide and to extend through the sleeve past the plate. The point is configured to pierce through soil below the plate. The probe has an inner cavity that is open at the point and configured to receive soil when the point pierces through soil, and a window through the probe to the inner cavity configured to allow the soil in the inner cavity to be viewed through the probe.

20 Claims, 6 Drawing Sheets

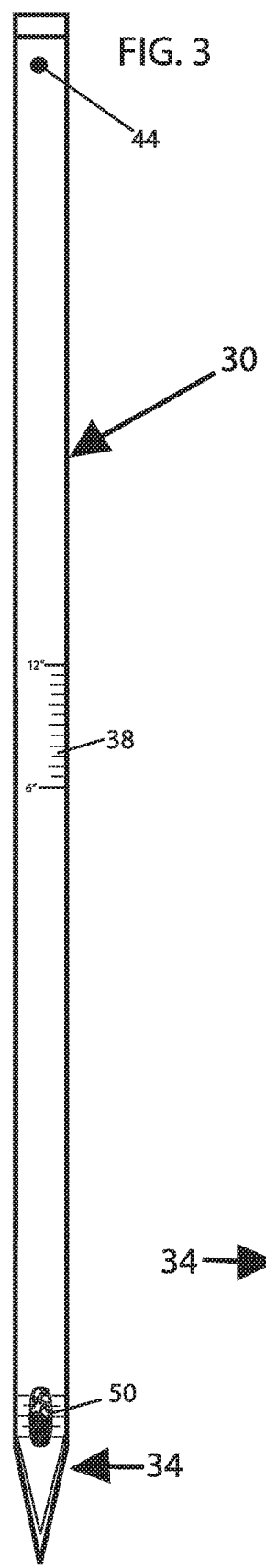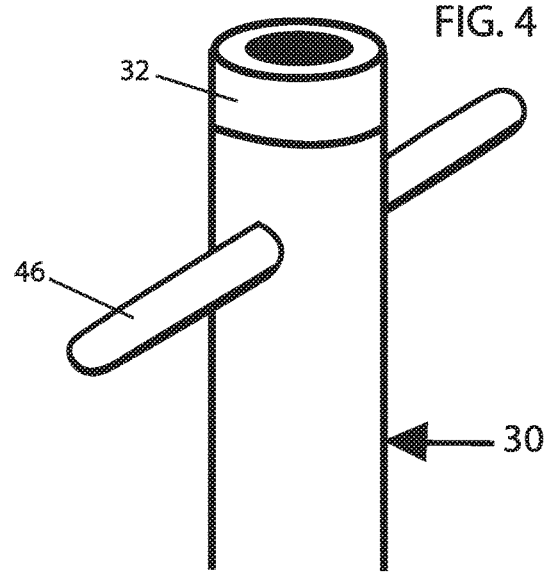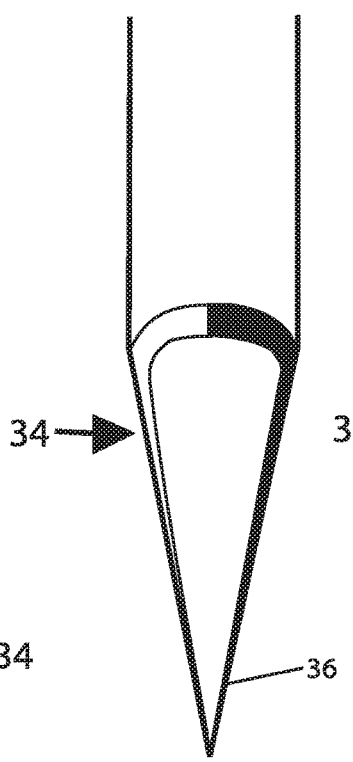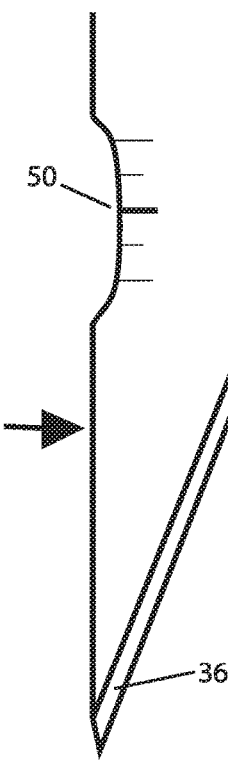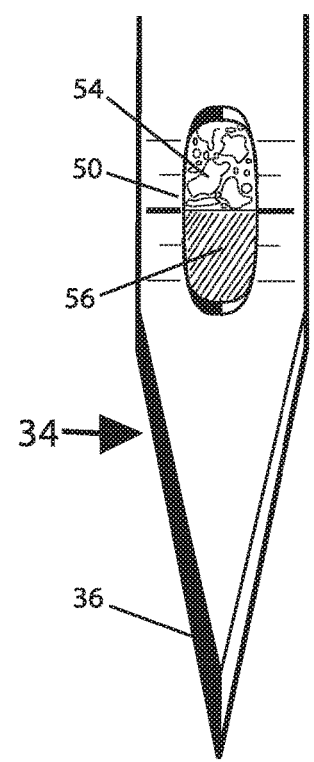

SOIL EXTRACTION AND MEASUREMENT TOOL

FIELD

The present description relates to a tool for extracting a soil sample and measuring its characteristics.

BACKGROUND

In a variety of different construction methods, layers of material are laid over a substrate or base layer. The thicknesses of these layers or lifts are controlled and determined by engineering design for quality, cost, and regulatory purposes. As an example, in the construction of transportation systems such as state highways and local roadways, an aggregate base course is applied to the ground and a paving surface of asphalt hotmix, warm-mix or concrete is then laid over the aggregate base course. To ensure the durability of the eventual roadway, the aggregate base course is processed in place and compacted. Resulting in a particular thickness over the natural ground or native soil (sub-base), to a tolerance of plus or minus one inch (+/−1") (2.5 cm) with an accuracy of a quarter of an inch (0.6 cm).

The thickness of the various layers is often measured using a pick-axe, shovel, straight edge, and a tape measure. The tester breaks through the various layers of compacted material using a pick axe to then dig a hole using a shovel, post hole digger, or other digging tool. The straight edge is then placed across this hole after the mound of displaced material is scraped off flat to the same plane as the surrounding surface. Then a tape measure is placed into the resulting hole against the straight edge, which now marks the top or surface of the material to measure the total depth of the layers. For large construction projects many tests are made across the surface of the material at a required frequency or distance using a random sampling plan to assure compliance with specifications and standards of various federal, state or local agencies throughout the construction.

SUMMARY

A soil extraction and measurement tool is described. In one example, the tool has a guide having a sleeve and a plate. The sleeve is attached to the plate, extending substantially horizontally from the plate, and has an opening to receive a probe. A probe has a point at an end configured to be inserted into the sleeve of the guide and to extend through the sleeve past the plate. The point is configured to pierce through soil below the plate. The probe has an inner cavity that is open at the point and configured to receive soil when the point pierces through soil, and a window through the probe to the inner cavity configured to allow the soil in the inner cavity to be viewed through the probe.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

FIG. 3 is a side view diagram of a probe for measuring soil according to embodiments of the invention.

FIG. 4 is an isometric view of the top end of the probe of FIG. 3 showing a handle according to embodiments of the invention.

FIG. 5 is an enlarged side view diagram of the point end of the probe of FIG. 3 showing the window according to embodiments of the invention.

FIG. 6 is an enlarged side view diagram of the point end of the probe of FIG. 3 showing the angled point.

FIG. 7 is an enlarged side view diagram of the point end of the probe of FIG. 3 showing the window filled with two layers of soil.

DETAILED DESCRIPTION

A tool is described herein that may be used to extract samples of varied layers of aggregate base course, and other materials, that have been applied over each other. The tool shows depth measurements for the layers. In one example, the tool extracts a sample of in place compacted aggregate base course for the purpose of determining the depth of a single or multiple lifts (layers). As described herein, the tool is configured for use as an aggregate base course depth analyzer. The tool may be used to check the depth of an in-place compacted aggregate base course that is commonly used in the construction of roadways, including highways and freeways. However the invention is not so limited.

According to many highway construction specifications, the native soil must be brought to an appropriate grade for the size and course of the roadway. One or up to two 6" (15 cm) layers (lifts) of aggregate base course must then be applied over the native soil subgrade. The aggregate base course has a large percentage of crushed stone or gravel within a well-graded soil mix. The aggregate may be made of crushed asphalt paving material, crushed concrete paving material, glass, and other materials. The paving surface is then applied over the compacted aggregate base course layer. The thickness and composition of the aggregate base course layer varies with different constructions, native soils, exterior environments, and engineering challenges.

When an aggregate base course depth check is done for this type of roadway with a conventional pick-axe, the prepared surface is disrupted. A tester will normally dig a large hole forming a crater with a diameter of approximately 3 feet (1 m) and a depth of about 2 feet (0.7 m). The holes leave a mound of aggregate that has been removed from the hole to allow for the layers to be seen and depth measurements to be made within the hole. A large number of such holes is not only difficult to dig but also reduces the integrity of the roadway and requires heavy equipment to repair the many test locations. The heavy equipment used for this repair usually consists of a water truck, grader and/or a tandem or static roller. If automated or powered diggers (heavy equipment) are used to create the test holes for depth analyzing then the diggers must be configured to leave a clean side wall in the hole and a clean top surface adjacent the hole so that depth measurements can be accurately made. As a result, these holes are normally dug slowly and by hand.

Figure 1:
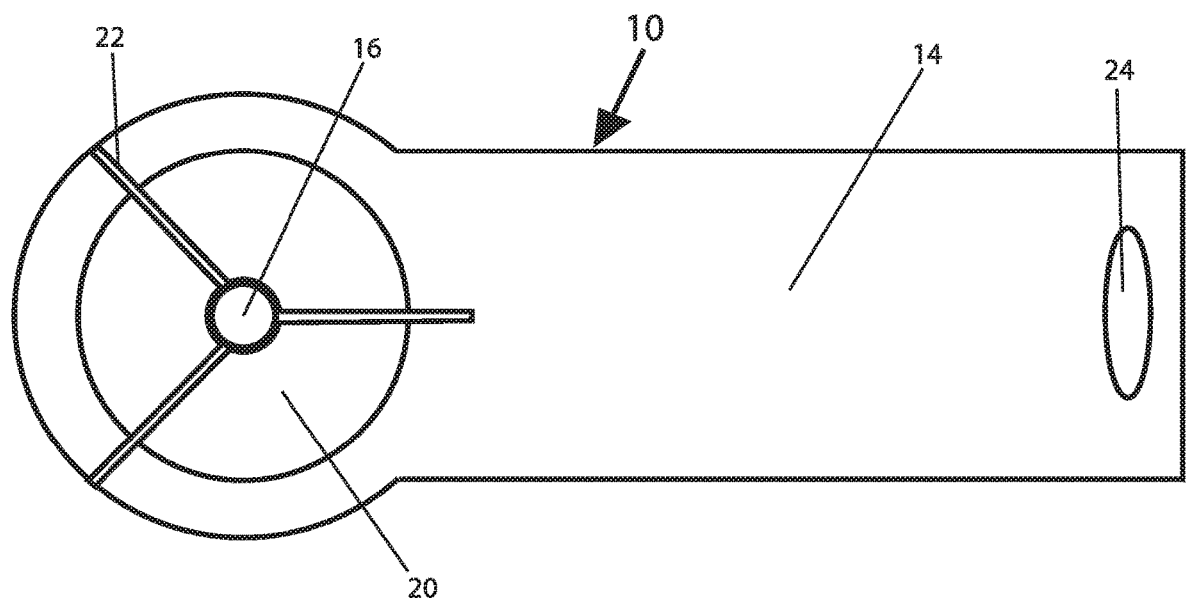
FIG. 1 is a top view diagram of a guide for a soil measurement probe according to embodiments of the invention.
Figure 2:
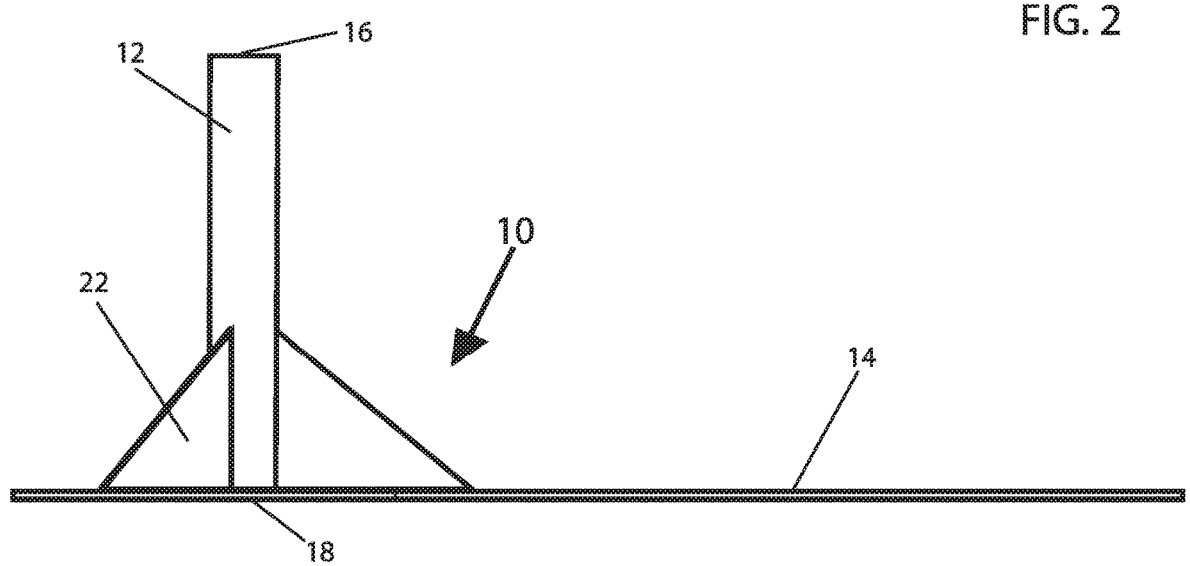
FIG. 2 is a side view diagram of the guide of FIG. 1.

The described tool includes a guide and a probe. The guide 10 shown in the example of FIG. 1 has a sleeve 12 attached to a plate 14. FIG. 1 is a top view diagram of a guide and FIG. 2 is a side view diagram of the same guide. The plate 14 rests horizontally on the ground or at grade if the ground is not horizontal to establish a reference level of grade for the top surface of the ground. This reference is used for the depth measurements. The plate also establishes a reference for horizontal. The sleeve 12 extends orthogonally upward from the plate and provides a reference for vertical with respect to the plate. The sleeve has an opening 16 at one end to receive the probe and an opening 18 at the other end facing the ground. The sleeve can be a steel pipe welded to a simple flat steel plate, but it may alternatively be formed of other materials and attached in other ways.

As shown in FIG. 1, the plate 12 may have an opening 20 shown as circular in this example but any other shape may be used. Girders 22 are attached to the plate 12 and to the sleeve 14 to buttress the sleeve in the vertical position. The girders take the form in this example of triangular steel plates with one side attached to the sleeve, and another adjacent side spanning across the opening and attached to the plate near the opening. The plate has a peripheral section surrounding the opening to which all of the girders attach. The girders may be used with or without the opening in the plate. The plate also has a rounded slot cut through the plate to form a handle 24 at one end opposite the sleeve for carrying, hanging, storage, lifting and other purposes. The opening around the sleeve may also or alternatively be used as a handle as may the sleeve.

An example of a probe 30 suitable for use with any of the guides shown here is shown in a side view in FIG. 3. The probe has an elongated cylindrical body or tube that is hollow at least at one end. The probe may be made from a strong pipe that is smaller in outer diameter than the inner diameter of the guide. The probe has a boss 32 at one end to receive an external force to drive a point 34 at the opposite end into the ground or soil. The point 34 is formed as a diagonal cut through the pipe at the end of the probe. Other point shapes may be used to suit different soils. The probe has a distance scale 38 with a set of depth marks. These depth marks allow the depth of the point from the guide plate through the soil below the plate to be conveniently determined as described in more detail below.

The probe is in the form of a hollow tube with a point at one end. This tube may be built from another steel pipe of heavy high quality grade steel or equivalent material as to prevent deformation. The probe is slightly smaller than the sleeve so that the outside diameter of the probe fits tightly within the inside diameter of the sleeve and is able to move freely longitudinally through the sleeve. Other materials may alternatively be used and the materials and design may be adapted to suit different uses and different layers. The nature of the layers through which the probe is driven and which are to be measured may require different types of probe materials.

The probe inserts into the top of the sleeve of the guide with the point first. The point then slides through the sleeve past the plate and to the ground. The point of the probe can then be driven into the ground through the sleeve to pierce through soil below the plate. The probe has an inner cavity that is open at the point so that as the point is driven through the soil, at least some of the soil is driven into the probe as the point pierces through the soil.

FIG. 4 is a perspective view of the top of the probe 30 including the boss 32. A handle 46 in the form of a steel rod is inserted through opposing holes 44 at the top of the guide. The handle allows the probe to be removed from the soil and the guide. It also aids in moving and carrying the probe. While the handle is shown as linear and removable, the handle may be permanently attached and take any of a variety of different forms. In this example, the handle allows the probe to be rotated about its longitudinal axis or axis of elongation. This may allow the probe to be freed from soil more easily before it is lifted out of the guide sleeve. In some use cases, the probe is rotated after it reaches an appropriate depth so that the tip cuts a cylinder in the soil around the tip of the probe.

FIG. 5 is a rear side view of the probe to show the configuration of the point 34. As mentioned, the probe 30 is hollow with a cylindrical outer wall and the point 34 is a diagonal cut at an end of the cylindrical wall. The diagonal cut has a long edge at a tip 36 of the point on a side of the cylindrical outer wall. The cut may be sharpened on all sides to move through the soil more easily. As seen in this view, the interior of the probe is open to receive soil as the probe moves down through the soil.

FIG. 6 is a side view of the probe to show the diagonal configuration of an possible example of the point 34. As mentioned, the probe 30 is hollow with a cylindrical outer wall and the point 34 is a diagonal cut at an end of the cylinder. The diagonal cut has a long edge at a tip 36 of the point on a side of the cylindrical outer wall. The window 50 is an elongated slot through the cylindrical outer wall on a same side as the tip. Since the tip is longer than the cut, there is more material on the tip side for the window. The distance from the end of the tip to the markings or scale around the window is configured for a particular distance measurement. The size of the probe is adapted to suit required sample sizes or to suit particular soils. In this particular example the probe has an inner diameter of 1.5" (3.8 cm) which accommodates material with a nominal aggregate size of up to an inch (2.5 cm). The most common used being ¾" (1.9 cm) and then the next common being 1" (2.5 cm).

FIG. 7 is a front side view of the point 34 and the window 50 of the probe for observing the sampled soil. The window has a central mark and a series of marks on either side of the window to form a distance scale. The sampled soil core collected by the probe is visible through the window. In the illustrated example, there is an upper layer of aggregate 54 and a lower layer of native soil 56. The boundary between these two layers inside the probe is visible through the window 50. The distance scale allows an observer to see whether the boundary is above or below the central mark. The distance scale may correspond to inches, centimeters, or suitable regulation-based distances so that an accurate measurement of the position of the lift boundary may be determined.

If the boundary is not visible in the window then the depth of the boundary is beyond the range that has been measured by the probe. If the window shows only aggregate, then the probe may be driven deeper into the ground to find the boundary. If the window shows only native soil, then the aggregate layer is too thin.

Figure 8:
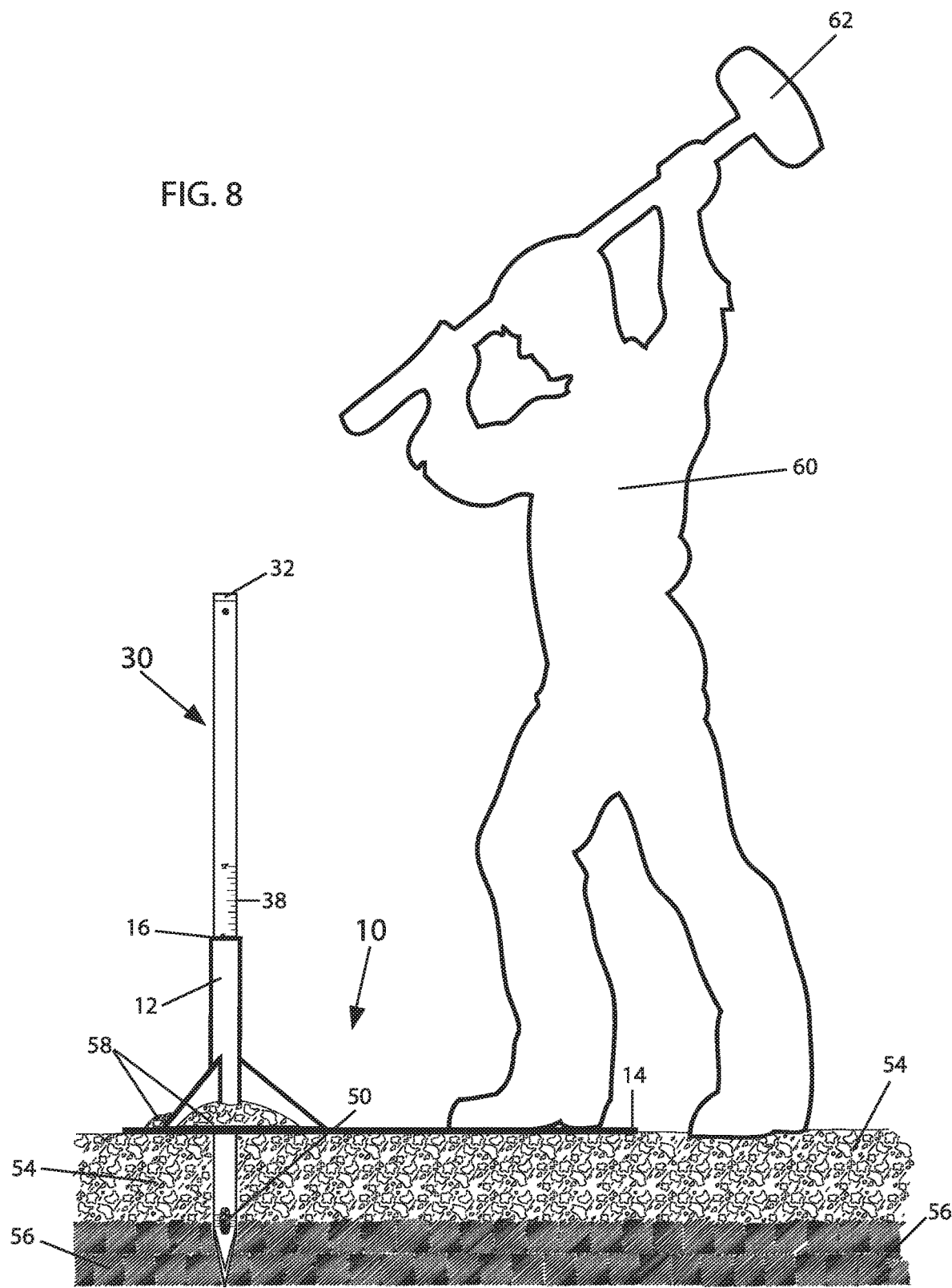
FIG. 8 is a side view diagram with the soil cut away showing driving the probe into the soil through the guide using a sledge hammer according to embodiments of the invention.

FIG. 8 is a side view diagram of the probe and guide in use. The guide 10 is placed on the ground with the plate 14 flat against the level from which the measurement is to be taken. The probe 30 is placed through the sleeve 12 of the guide. The operator may stand on the plate 14 of the guide as shown to secure the guide against the ground and help the sleeve to remain vertical in use. The plate provides a footrest to the user. The user may use this footrest as a smooth traction surface to stabilize the body for manipulating the probe. In this example the ground is shown in cross section as having a layer of aggregate 54 over a layer of native soil 56. The guide has been placed on the aggregate. The probe allows the depth of the boundary between these two layers to be measured. The soil may have other configurations with more and different layers. Boundaries between different layers at different depths may be measured using the same or a similar probe with appropriate marking on the depth scale 38.

With the guide stabilized and positioned and the probe in the sleeve, the probe 30 may then be driven down into the ground with a hammer, a pipe driver, or any other suitable means 62. In this example, an operator 60 strikes a sledge hammer against the boss 32 of the probe to drive the probe into the ground through the sleeve 14. A scale 38 on the probe indicates when the probe has reached the intended depth. The operator can read the scale so that when an appropriate mark on the probe depth scale reaches the top 16 of the opening of the sleeve12, then the probe has reached the intended depth. Other types of indicators may alternatively be used. The probe may have a single depth mark on the scale 38 for use at a single depth. Alternatively, additional marks may be used to perform different core sampling tests at different depths.

After the probe is driven to the intended depth, then the probe can be pulled up out of the soil and out of the sleeve using e.g. the handle 46. The depth of the aggregate layer may be measured by observing the sample through the window 50 in the extracted probe. When the probe is withdrawn from the sleeve, the inner cavity of the probe should be filled with a core sample of the soil. The window through the probe to the inner cavity allows the soil in the inner cavity to be viewed through the probe window. This window can be as simple as a hole or slot in the sidewall of the probe or it may be more complex. The window is near the point of the probe so that the probe is not driven any farther than necessary into the soil.

For a typical test, the probe is driven into the soil deep enough that the center of the window is at about 6 inches. When the probe is driven down until the 6" (15 cm) indicator mark meets the top 16 of the sleeve 14 on the guide plate 12, the middle of the window or viewing port will be 6" (15 cm) down below the surface of the ground as determined with respect to the plate 14. The window is a slot elongated along the length of the probe and there are markings along the window to indicate the center of the window and distances above and below the center. As an example, there may be marks 2" (5 cm) above and below the center and 4" (10 cm) above and below the center. The tester looks at the soil 54, 56 through the window and determines the depth of the boundary between the layers looking at the marks. The depth of this layer boundary may be used to verify the quality of the construction or to adapt processes to better match a particular intended depth. By driving the probe to different depths, layer boundaries at different depths can be observed.

The described system is configured for maximum accuracy and minimum soil disturbance. As shown, when the probe is driven into the ground, some soil will be displaced by the probe. The opening 20 around the sleeve allows the displaced soil 58 to rise above the ground without moving the plate. The opening for displaced soil helps to provide an accurate distance measurement with respect to the guide plate 12, since the guide plate is not moved by the displaced soil. After observing the window, the probe may be cleaned by shaking, striking or vibrating the probe.

The combination of guide and probe allows for a reliable accurate depth check. The probe is driven directly vertically into the ground as provided by the sleeve and the plate. The probe is driven to a precise depth as provided by the depth marks on the probe. The probe makes only a very small hole in the soil. This is far easier and more accurate than using a shovel. The window or viewing port allows the quality of the extracted layers to be checked as well as the quality of the boundary between them. The depth marks allow for a quick and reliable depth measurement to be made directly from the probe. This is far easier than maneuvering a ruler around an edge of a hole below grade.

The described probe also puts the native soil and aggregate on display through the window. These materials may be extracted for analysis. There are typically strict standards for the materials and condition of the aggregate that depend upon the nature of the native soil. The aggregate and soil are both easily studied using the probe window. If there are additional layers to study, the probe may be driven deeper into the same or a different hole to check layers at another level.

Figure 9:
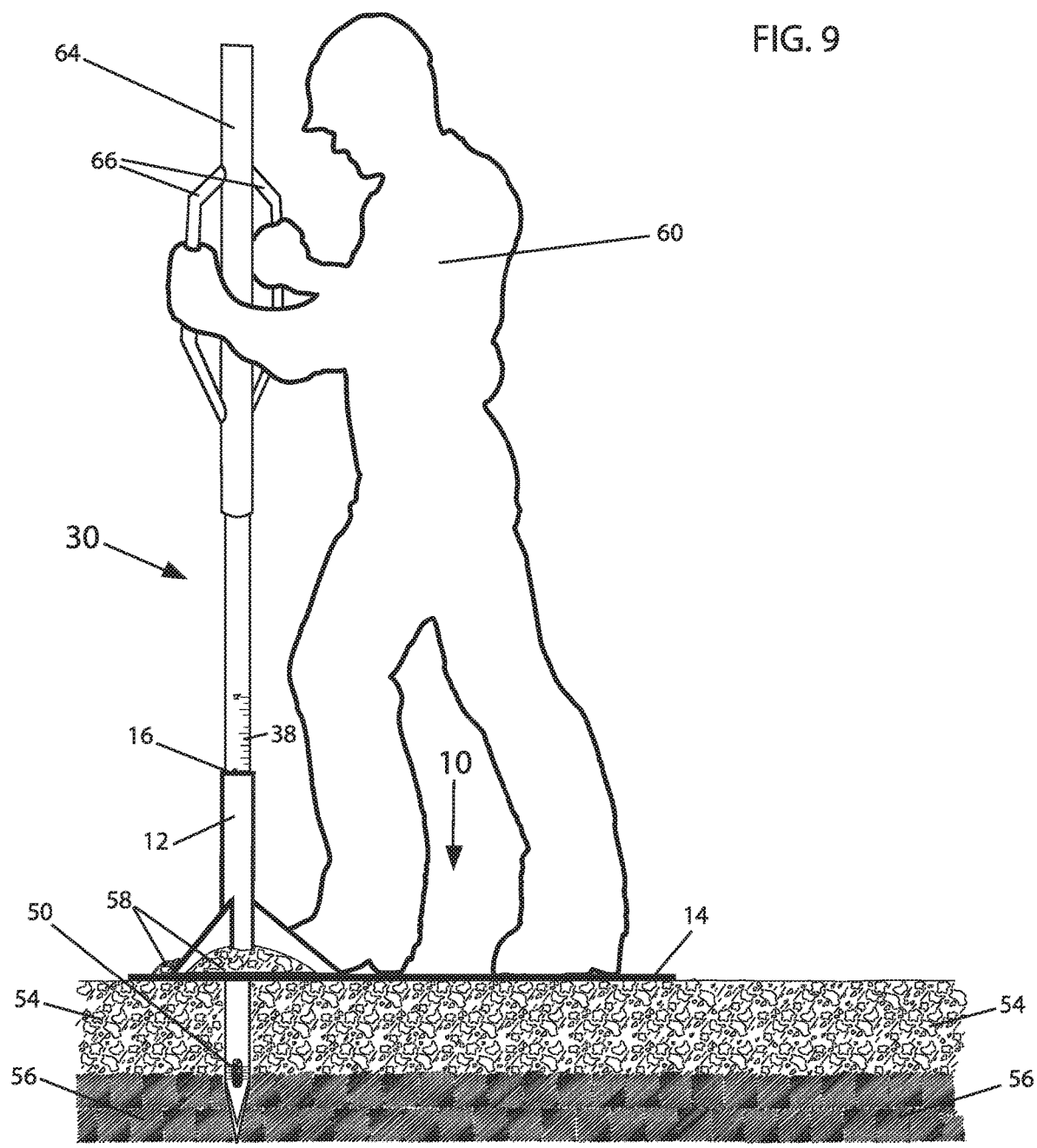
FIG. 9 is a side view diagram with the soil cut away showing driving the probe into the soil through the guide using a slide hammer according to embodiments of the invention.

FIG. 8 shows how the tool would work when the probe is driven down until the 6" indicator mark meets the top of guide plate, the middle of the viewing port will be 6" down from surface of a roadway. The depth marks on the probe allow the probe to be used to also test 12" of aggregate base course (ABC). The markings or graduations on the viewing port or window give indications of plus or minus 2 inches and 4 inches or any other desired distance from the target depth. The soil is sampled with minimal disturbance upon completion of the test FIG. 9 is a side view diagram of the probe and guide in an alternative use. The guide 10 is placed on the ground as before in the intended location to take a sample. The probe 30 is placed through the sleeve 12 of the guide. The operator stands on the plate 14 of the guide to secure the guide against the ground and to hold the sleeve vertical to the ground. As before, the ground has a layer of aggregate 54 over a layer of native soil 56. The guide has been placed on the aggregate.

With the guide stabilized and positioned and the probe in the sleeve, the probe 30 is driven down into the ground with a slide hammer, or fence post hammer 64. The hammer has a sleeve that has been placed around the probe and covers a part of the probe. In this example, an operator 60 holds handles 66 of the slide hammer, lifts the hammer upwards and pushes the hammer downwards quickly so that an inner wall (not shown) within the sleeve of the hammer strikes the boss 32 (not shown) of the probe 30 to drive the probe into the ground through the sleeve 14. Repeated vertical lifts and strikes drive the probe to the desired depth. The slide hammer 64 offers more control then the hammer 62 of FIG. 8.

After the probe is driven to the intended depth, the slide hammer is lifted off the probe. The handle 46 (not shown) may then be reinstalled on the probe to remove the probe from the guide. The probe is pulled up out of the soil and out of the sleeve using the handle 46. Alternatively, in this and other examples, the probe may be withdrawn by grasping the probe without benefit of a hammer. The depth of the aggregate layer 54 can be measured by observing the sample through the window 50.

While FIGS. 8 and 9 show manual driving and removal of the probe, this is not necessary. The illustrated probe may be driven in to the ground or removed or both using a backhoe and suitable attachment. The probe may also be driven into the ground and withdrawn using heavy machinery with any of a variety of different hydraulic, pneumatic, or power attachments.

Figure 10:
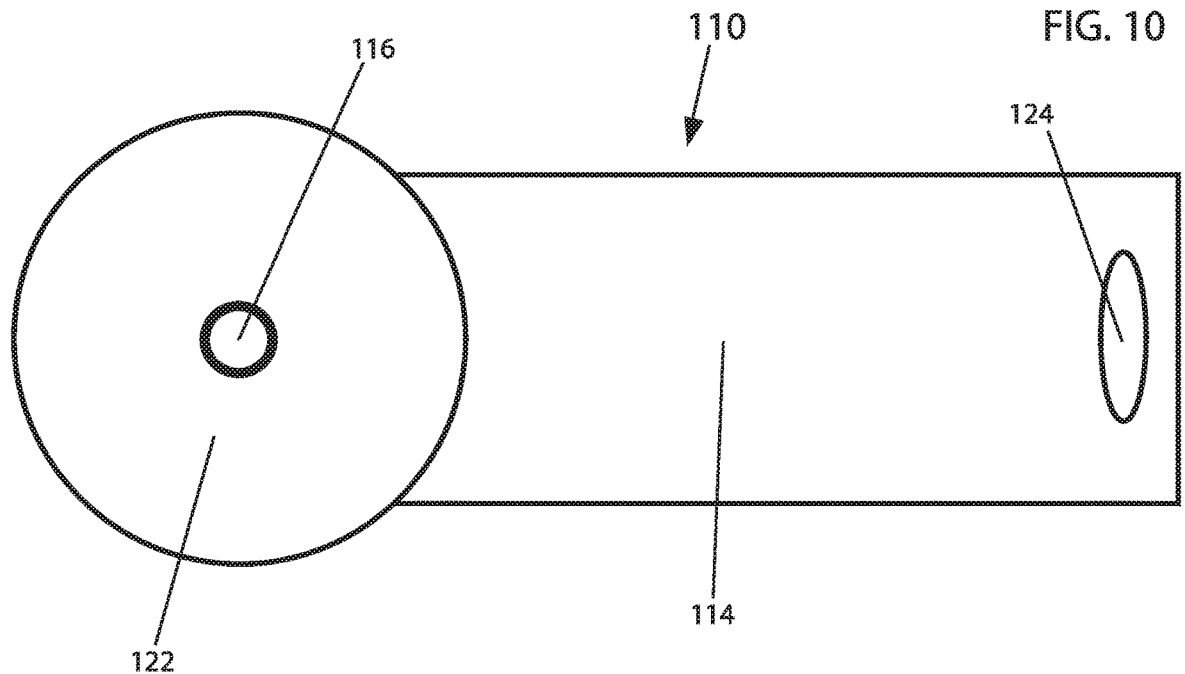
FIG. 10 is a top view diagram of an alternative guide for a soil measurement probe according to embodiments of the invention.
Figure 11:
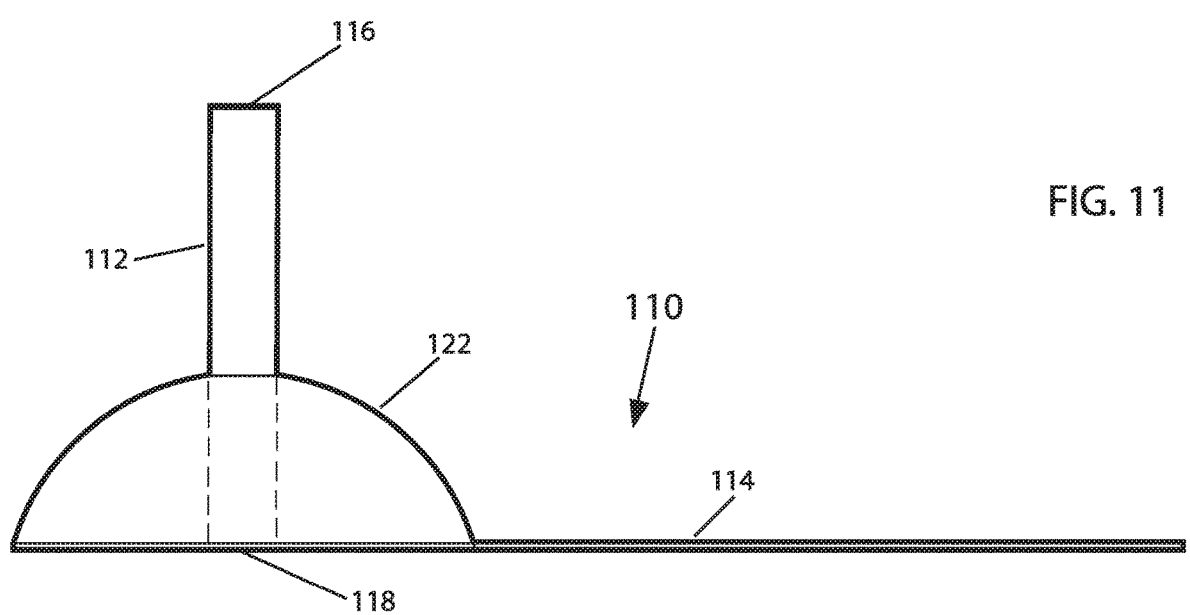
FIG. 11 is a side view diagram of the guide of FIG. 10.

FIG. 10 shows an alternative configuration for a guide 110. The guide 110 has a sleeve 112 attached to a plate 114. FIG. 10 is a top view diagram of the guide and FIG. 11 is a side view diagram of the same guide. The plate 114 is configured to rest on the ground to establish a reference level for the top surface of the ground in the same way as the other guide plates. The sleeve 112 extends orthogonally upward from the plate and provides a reference for vertical with respect to the plate. The sleeve has an opening 116 at one end to receive the probe and an opening 118 at the other end facing the ground.

As shown in FIG. 11, the plate 114 has a dome 122 attached to the plate 114 and to the sleeve 112 to attach to and hold the sleeve in the vertical position. The dome takes the form in this example of a hemispherical rounded dome with a central opening attached to the sleeve, and a part of the periphery attached to the plate on a side of the dome and a curved end of the plate. The plate has an arced or partially circular end surrounding a side of the dome to which it attaches to the dome, although the plate may have other shapes. The plate also has a handle 124 at one end opposite the sleeve for carrying, hanging, storage, lifting and other purposes.

The probe inserts into the top 116 of the sleeve 112 of the guide 110 with the point first in the same way as with the previous examples. The dome 122 provides an inner cavity that is open at the point so that as the point is driven through the soil, soil that is forced up around the probe collects inside the dome without disturbing the position of the guide plate. The dome allows the soil to collect near the sleeve so that when the guide is picked up, the soil is more easily returned to the hole that was made and left by the probe.

In this alternative configurations, instead of an opening around the sleeve, the dome is formed of a half spherical piece or otherwise raised frame around the sleeve. The dome rises above the plate to form a reservoir. The reservoir provides a place for soil to mound up without the soil pushing the plate upwards which would disturb the measurement. The sleeve is attached to the center peak of the dome and the plate is attached to the periphery of the dome. The reservoir may be in the shape of a dome or any of a variety of other shapes and need not be perfectly hemispherical as shown.

Figure 12:
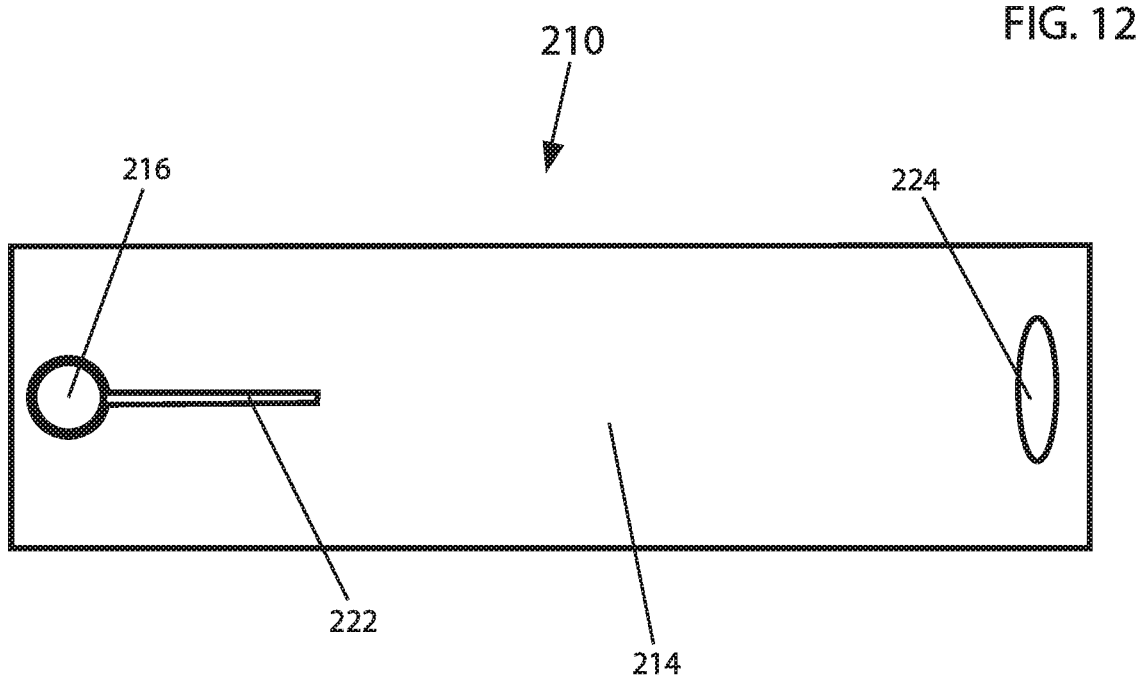
FIG. 12 is a top view diagram of another alternative guide for a soil measurement probe according to embodiments of the invention.

FIG. 12 is a top view diagram of another alternative configuration for the guide plate. In this configuration, the guide plate is solid with no opening or rise to allow soil to mound up around the probe. In some cases, this solid plate may have an issue of being pushed out of perpendicularity by the ABC that is displaced by the probe being driven down. With the opening shown in FIG. 2 or the recess shown in FIG. 11 on the guide plate the displaced ABC is allowed to mound up without moving the probe out of perpendicularity. In some cases, such movement would give false readings much greater than the 2-4 inch variations of a true reading. For more liquid soils, a solid guide plate may be suitable for at least some tests.

Figure 13:
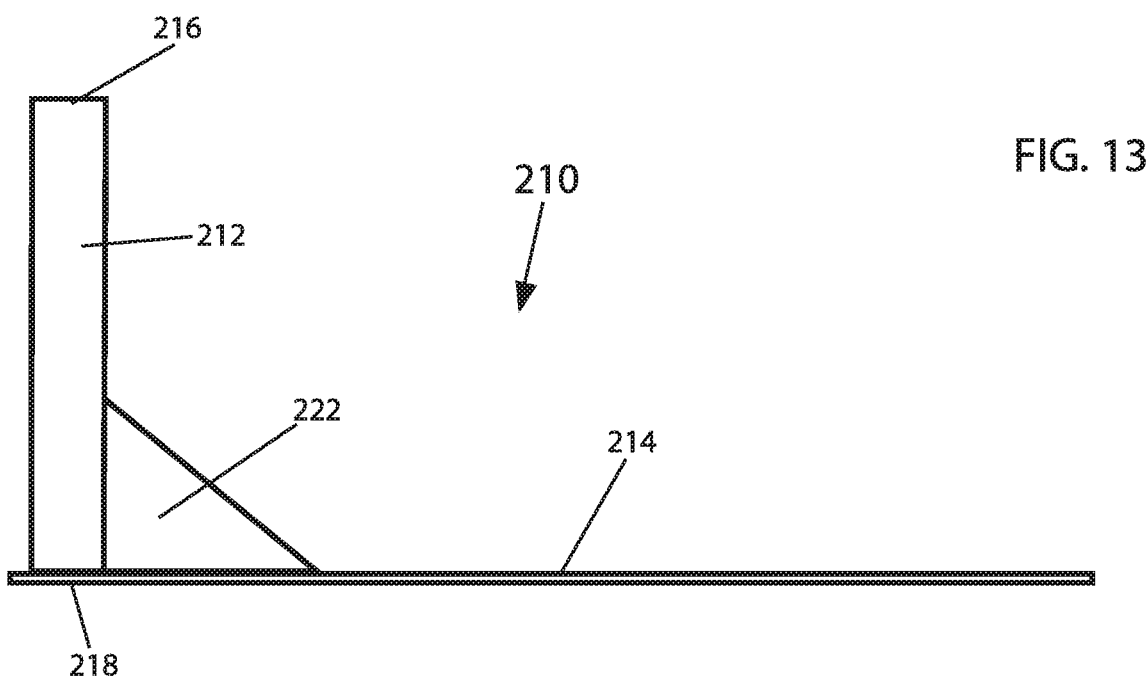
FIG. 13 is a side view diagram of the guide of FIG. 12.

A guide 210 is shown in FIG. 12 in such a flat or solid plate configuration. This guide is easier to produce, very strong and may be suitable in many applications. The guide 210 has a sleeve 212 attached to a solid flat plate 214. FIG. 12 is a top view diagram of the guide and FIG. 13 is a side view diagram of the same guide. The plate rests on the ground to establish the reference for depth measurements and for horizontal. The sleeve 212 extends orthogonally upward from the plate with an opening 216 at one end to receive the probe and an opening 218 at the other end through which the probe pierces the ground. The sleeve may be attached to a hole through the plate.

One or more girders 222 are attached to the plate 214 and to the sleeve 212 to buttress the sleeve in the vertical position. The illustrated girders are in the form of triangular steel plates with one side attached to the sleeve, and another adjacent side attached to the plate near the opening, but other shapes may be used instead to provide strength in different uses. The plate also has a handle 224 at one end opposite the sleeve for carrying, hanging, storage, lifting and other purposes. The sleeve may also be used as a handle in this and other example embodiments.

The same probe with the same scales and window may be used with this guide as with the previous guides. The same heavy high quality grade steels or equivalent materials may be used for any of the guides and probes.

A lesser or more equipped probe and guide than the examples described above may be desirable for certain implementations. Therefore, the configuration of the system will vary from implementation to implementation depending upon numerous factors, such as price constraints, performance requirements, technological improvements, and/or other circumstances.

The present description presents the examples using particular terms, such as tip, point, boss, sleeve, window, soil, aggregate, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:
1. A measurement tool comprising:
  a guide having a sleeve and a plate, the sleeve attached to the plate, extending substantially vertically from the plate, and having an opening to receive a probe, the guide further comprising a connector to connect the plate to the sleeve; and a probe having a point at an end of the probe configured to be inserted into the sleeve of the guide and to extend through the sleeve past the plate, the point being configured to pierce through soil below the plate, the probe having an inner cavity that is open at the point and configured to receive soil when the point pierces through soil, and a window through the probe to the inner cavity configured to allow the soil in the inner cavity to be viewed through the probe,
wherein the plate has an opening around the sleeve configured to allow soil displaced by the probe as the probe pierces through soil below the plate to rise above the plate, the connector comprising an opening configured as a reservoir around the sleeve configured to allow soil to collect above the probe, wherein the reservoir is formed by a domed circular plate surrounding the sleeve and having a periphery attached to the plate.

2. The tool of claim 1, further comprising a mark on the probe near the window configured to indicate a distance from the plate.

3. The tool of claim 1, wherein the window is elongated along the probe and the mark comprises a distance scale having a plurality of distance indicators near the window.

4. The tool of claim 1, wherein the probe is elongated to extend outside the sleeve opposite the probe when the probe pierces through soil below the plate, the probe further comprising a depth mark on the probe near an end opposite the point, the depth mark indicating a distance of the tip from the plate.

5. The tool of claim 4, further comprising a plurality of additional depth marks proximate the depth mark to indicate additional distances.

6. The tool of claim 4, wherein the sleeve has an end opposite the plate and wherein the depth mark is configured to be aligned with the end of the sleeve when the probe extends the indicated distance from the plate.

7. The tool of claim 1, wherein the plate is configured to be placed on a top surface of the soil and to align the sleeve orthogonal to the top surface.

8. The tool of claim 1, wherein the probe has a boss at an end opposite the point configured to receive an external force to drive the point into the soil.

9. The tool of claim 1, wherein the probe is formed of a cylindrical steel pipe.

10. The tool of claim 9, wherein the sleeve is formed of a cylindrical steel pipe.

11. The tool of claim 1, wherein the probe is hollow with a cylindrical outer wall and the point is a diagonal cut at an end of the cylindrical outer wall.

12. The tool of claim 11, wherein the diagonal cut has a long edge at a tip of the point on a side of the cylindrical outer wall and wherein the window is an elongated slot through the cylindrical outer wall on a same side as the tip.

13. The tool of claim 1, wherein the plate provides a footrest.

14. A depth measurement probe comprising:
an elongated hollow cylindrical body having an inner cavity;
a point at a first end of the body, the point being formed as an end of a diagonal cut across the hollow cylindrical body, the point being configured to pierce through soil below grade, and being open at the point to receive soil when the point pierces through soil;
a boss at a second end of the body opposite the point configured to receive an external force to drive the point into the soil;
a depth mark on the body to indicate a depth of the point into the soil relative to grade; and
a window through the body to the inner cavity configured to allow the soil in the inner cavity to be viewed through the probe, wherein the window is on a same side of the hollow cylindrical body as the tip of the point; and
a mark on the probe near the window configured to indicate a distance on the window relative to the grade.

15. The probe of claim 14, wherein the probe is formed of a cylindrical steel pipe.

16. The probe of claim 14, wherein the window is elongated along the probe and the mark comprises a distance scale having a plurality of distance indicators near the window.

17. The probe of claim 14, further comprising a handle in the form of a rod removably inserted through opposing holes.

18. The probe of claim 17, wherein the handle extends across a longitudinal axis of the probe for rotation of the probe about the longitudinal axis using the handle.

19. The probe of claim 14, further comprising a guide having a sleeve and a plate, the sleeve attached to the plate, extending substantially vertically from the plate, and having an opening to receive the probe and guide the probe to pierce though the soil below the plate.

20. The probe of claim 19, further comprising girders to attach the sleeve to the plate, the girders extending across an opening in the plate to the sleeve.

* * * * *